A. DUNLAP.
FLY TRAP.
APPLICATION FILED SEPT. 3, 1913.

1,136,414.

Patented Apr. 20, 1915.

WITNESSES:
Charles Pickles
F. E. Maynard.

INVENTOR
Albert Dunlap.
BY G. H. Strong.
ATTORNEY

THE NORRIS PETERS CO., PHOTO-LITHO., WASHINGTON, D. C.

UNITED STATES PATENT OFFICE.

ALBERT DUNLAP, OF SAN PABLO, CALIFORNIA.

FLY-TRAP.

1,136,414. Specification of Letters Patent. Patented Apr. 20, 1915.

Application filed September 3, 1913. Serial No. 787,947.

*To all whom it may concern:*

Be it known that I, ALBERT DUNLAP, a citizen of the United States, residing at San Pablo, in the county of Contra Costa and State of California, have invented new and useful Improvements in Fly-Traps, of which the following is a specification.

This invention relates to insect traps, and particularly to fly traps.

It is one of the objects of the present invention to provide a trap having means provided for ready ingress of flies and providing a trapping chamber divided into compartments so that the wall area of the chamber is greatly increased; the object of the increase of the wall area being to direct the flies more rapidly through the trapping gate of the cage.

A further object of the invention is to provide an improved fly trap with a bottom or basin portion formed to lie flat upon a table, shelf, or other support, thus avoiding the use of legs which ordinarily elevate the base of the trap considerably above the supporting plane, the advantage of constructing the base so as to set flat upon the supporting plane being that the insects may alight upon the supporting plane adjacent to the base and may have access directly into the trap from the supporting plane through the ingress provided in contradistinction to those types of traps which are elevated by legs above the supporting plane, thus necessitating the flies alighting on the perimeter of the bottom of the trap in order to have access thereto.

A further object of the invention is to provide a trap structure with a quickly detachable top position, and a quickly detachable bottom or basin portion for the removal and discharge of trapped and dead insects.

The invention further consists of the parts and the construction and combination of parts as hereinafter more fully described and claimed, having reference to the accompanying drawings, in which—

Figure 1:
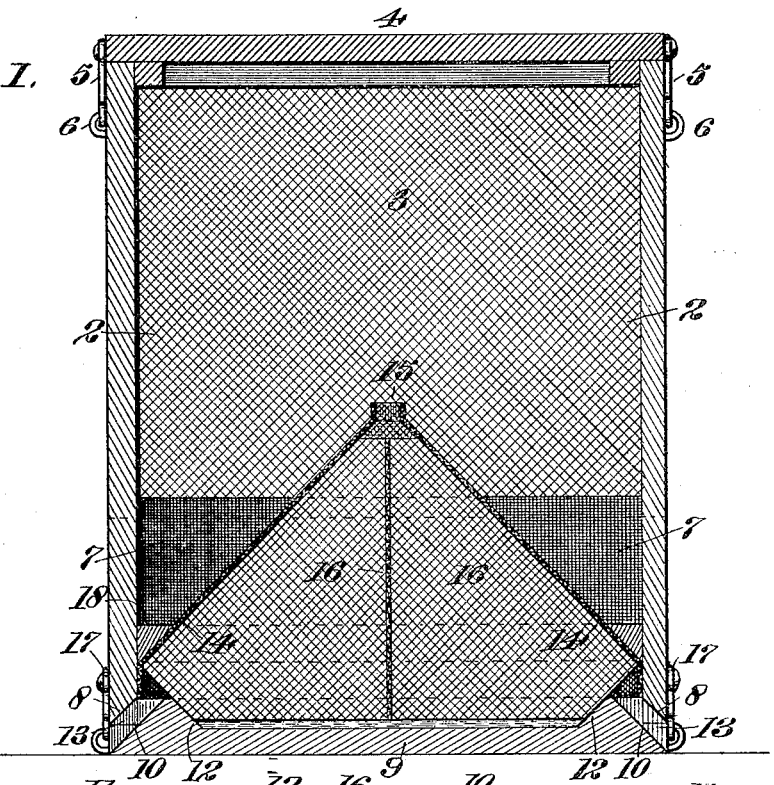
Figure 2:
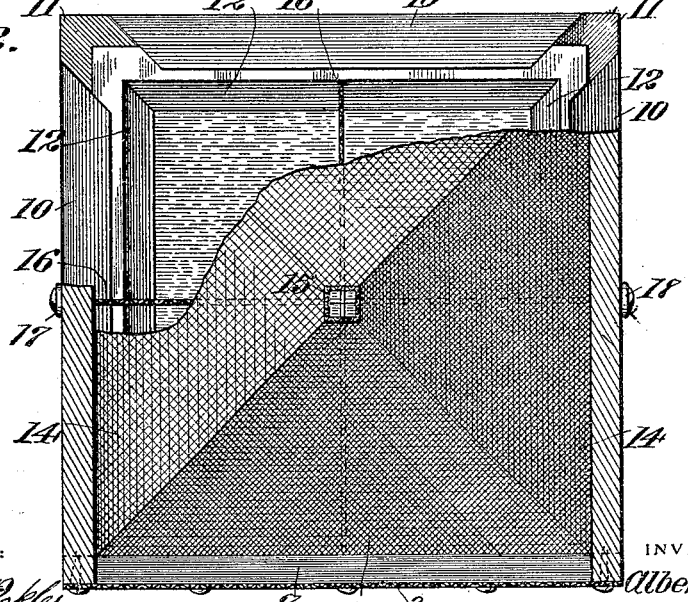

Figure 1 is a central vertical section through the improved trap. Fig. 2 is a horizontal section through the trap showing the inner trapping chamber, partly in plan and partly broken away.

In my present embodiment of the invention there is disclosed a cage or prison chamber 2 having foraminous or screen walls 3 or suitable sides, the prison chamber being closed at the top by a removable cover 4, having hooks 5 temporarily engaging staples or keepers 6 of the trap chamber 2; the lower portion of the sides of the prison chamber 2 may be formed of solid or opaque members 7, so that the lower portion of the trap chamber may be darkened while the upper portion is light, for the inducement of upward travel of insects.

While it is understood that the prison chamber may be of suitable transverse form, it is here shown as rectangular with the bottom edges of the side walls beveled upwardly and inwardly at 8, between the corners of the walls. The prison chamber 2 is readily fastened at its lower end upon a base 9 of a contour conforming to the section of the chamber; the base being provided with upwardly and inwardly beveled edges or surfaces 10 between its corners 11 upon which rest the corners of the trap chamber 2 when the latter is adjusted on the base 9. Preferably the base 9 is made of such material as is adapted to contain a bait of suitable character, such as fruit syrup or sweetened water; the center portion of the base 9 being beveled or recessed, as at 12, for the reception of the bait toward which the flies will travel through the passageway 13, which is formed between the opposed beveled surfaces 8 and 10, and enter into a trapping chamber having a converging top wall 14 which is provided with a central entrapping aperture 15 at its apex, through which flies caught in the chamber below the pyramidal wall 14 will travel and finally pass into the prison chamber 2.

I have found by observation that when a single trapping chamber 14 is used the flies passing through the ingress are apt to circulate around considerably before finally passing through the aperture 15 at the apex of the cell 14, and to obviate this free movement of the flies within the cell 14 I introduce a plurality of transverse walls or partitions 16 extending from side to side of the cell 14 and terminating just below the egress or trapping aperture 15; these walls 16 serving to divide the cell 14 into smaller chambers, thus confining the flies in their circulating movements and more rapidly directing them toward the trapping aperture 15.

I have shown the bottom edges of the transverse partitions 16 as extending well down toward the bottom of the bait basin 12 so as to prevent the flies from passing beneath the bottom edges of the partitions.

The cage or prison chamber 2 of the trap is readily detachable from and connectible to the base portion of the trap by means of hooks and eyes 17, so that dead or entrapped insects in the cell 14 can be removed by lifting the trap chamber 2 from the base 9, and when necessary the top 4 can be removed from the chamber 2 for similar purposes.

The acute angles formed by the intersection of the tapering walls of the cell 14 with the inner surface of the trap chamber 2 may be filled by cleats 18, which not only serve as a means upon which the member 14 may be secured but also act to prevent the sticking or jamming of dead insects in the small angle at the intersection of the contiguous surfaces.

Having thus described my invention, what I claim and desire to secure by Letters Patent is:

An insect trap comprising a base having a recess therein for receiving bait, the side walls of said recess being inclined, a prison chamber supported by the base, and a trapping cell inclosed by said chamber and having a plurality of intersecting walls which divide same into a plurality of compartments, said walls having their lower edges extending into the recess of the base and having their side edges beveled and engaging the inclined side walls of said recess, said cell having an opening therein common to all of the compartments to afford communication between the compartments and prison chamber.

In testimony whereof I have hereunto set my hand in the presence of two subscribing witnesses.

ALBERT DUNLAP.

Witnesses:
J. A. LONG,
F. W. PETERSON.

Copies of this patent may be obtained for five cents each, by addressing the "Commissioner of Patents, Washington, D. C."